US006814467B2

(12) United States Patent
Jenkins

(10) Patent No.: US 6,814,467 B2
(45) Date of Patent: Nov. 9, 2004

(54) LIGHT BOX WITH EXPANDING RODS AND FIRE RETARDANT COVER

(76) Inventor: Joshua Jenkins, 1629 Rochey Dr. Suite #1, Los Angeles, CA (US) 90027

( * ) Notice: Subject to any disclaimer, the term of this patent is extended or adjusted under 35 U.S.C. 154(b) by 97 days.

(21) Appl. No.: 10/261,723

(22) Filed: Sep. 30, 2002

(65) Prior Publication Data

US 2004/0062046 A1 Apr. 1, 2004

(51) Int. Cl.$^{7}$ .................................................. G03B 15/02

(52) U.S. Cl. .......................... 362/240; 362/11; 362/238; 362/418; 40/571; 40/574

(58) Field of Search ................................ 362/3, 11, 16, 362/125, 126, 154, 227, 235, 236, 237, 238, 239, 240, 249, 257, 294, 362, 367, 368, 370, 371, 418, 419, 426; 40/361, 366, 367, 564, 571, 574, 700, 739, 740, 741, 745, 747

(56) References Cited

U.S. PATENT DOCUMENTS

| | | | | | |
|---|---|---|---|---|---|
| 211,915 | A | * | 2/1879 | Koefoed | 362/426 |
| 3,311,745 | A | | 3/1967 | Gossner | |
| 3,936,023 | A | * | 2/1976 | Clifton | 362/396 |
| 4,504,888 | A | * | 3/1985 | Rosenthal | 362/18 |
| 4,788,628 | A | * | 11/1988 | Farrall | 362/18 |
| 4,998,189 | A | * | 3/1991 | Guggemos | 362/278 |
| 5,651,602 | A | * | 7/1997 | Tawil et al. | 362/18 |
| 5,858,488 | A | * | 1/1999 | Cohon | 428/34.5 |
| 6,106,125 | A | * | 8/2000 | Finn et al. | 362/367 |
| 6,176,598 | B1 | * | 1/2001 | Seligman et al. | 362/352 |

OTHER PUBLICATIONS

Gamproducts, Inc., "Toplight"—product brochure (one page, double sided).

Gamproducts, Inc., "Gambox"—product brochure (four pages).

Gamproducts, Inc., "Topbox"—product brochure (one page—double sided).

* cited by examiner

*Primary Examiner*—Thomas M. Sember
*Assistant Examiner*—Ismael Negron
(74) *Attorney, Agent, or Firm*—Blakely Sokoloff Taylor & Zafman

(57) ABSTRACT

A light box having a first frame and a second frame. The first and second frames each have many attaching rods. At least one removable fire retardant cover is connected to edges of the first and second frames. Many expanding rods are slidably connected to the expanding rods. Many light fixture attaching brackets are suitable for attaching to the second frame. The light fixture attaching brackets are adaptable to connect to a light bar having at least one light. The light bar is supported inside the second frame.

20 Claims, 14 Drawing Sheets

LIGHT BOX WITH EXPANDING RODS AND FIRE RETARDANT COVER

BACKGROUND

1. Field

This invention relates to light boxes, and more particularly to a versatile fire retardant light box.

2. Description of the Related Art

In the entertainment industry, which includes motion pictures, television, theatrical arts, etc., and in the photographic industry and other fields, it is necessary to light a set, stage or other area. For an indoor set in the motion picture and television industries, the key or primary lighting is provided opposite to where the camera and audience, if any, to avoid sound equipment (boom) shadows, etc.

On many sets, light box housings are made of disposable material, such as wood lined with foamcore. The wooden material is used to quickly form a box of desired dimensions. A diffusion film may be stapled or nailed to the front of the light box in order to modify the lighting effect. While these light boxes are made in the dimensions required for a certain light effect, these light boxes deteriorate due to the inexpensive construction. Also, due to the material used, these light boxes are flammable and are thus a fire hazard. Moreover, due to the excessive heat that the lights in the light box output, the light box deteriorates and sometimes must be discarded after use on a single set.

Moreover, the assembly and disassembling of a typical light box can be time consuming. The storage and handling of a wooden light box can lead to damage and failure of the light box.

SUMMARY

A light box is presented including a first frame and a second frame. The first and second frames each have many of attaching rods. At least one removable fire retardant cover is attached to many edges of the first and second frames. Also included are many expanding rods. The attaching rods are slidably attached to the expanding rods. Many light fixture attaching brackets suitable for attaching to the second frame is also included in the light box. The light fixture attaching brackets are adaptable to connect to a light bar having at least one light. The light bar is disposed between the first and second frames.

Also presented is a light box system. The light box system includes a front frame and a rear frame. The front and rear frames each have many attaching rods. At least one removable fire retardant cover is attached to many edges of the front and rear frames. Also included in the light box system are many expanding rods. The coupling rods are slidably connected to the expanding rods. Many light bar attaching brackets are removably connected to the rear frame. A light bar is attached to the light bar attaching brackets. The light bar has at least one light.

Further, presented is a device including many light fixture connecting brackets that are adapted to connect to a light box. The light fixture connecting brackets are adaptable to connect a light bar having at least one light within the light box.

Another device is presented that includes a light bar having at least one light. The light bar also includes at least one removable gripping pin.

BRIEF DESCRIPTION OF THE DRAWINGS

The embodiments are illustrated by way of example and not by way of limitation in the figures of the accompanying drawings in which like references indicate similar elements. It should be noted that references in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments," are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

DETAILED DESCRIPTION

The invention generally relates to a fire retardant light box. Referring to the figures, exemplary embodiments of the invention will now be described. The exemplary embodiments are provided to illustrate the invention and should not be construed as limiting the scope of the invention.

Figure 1:
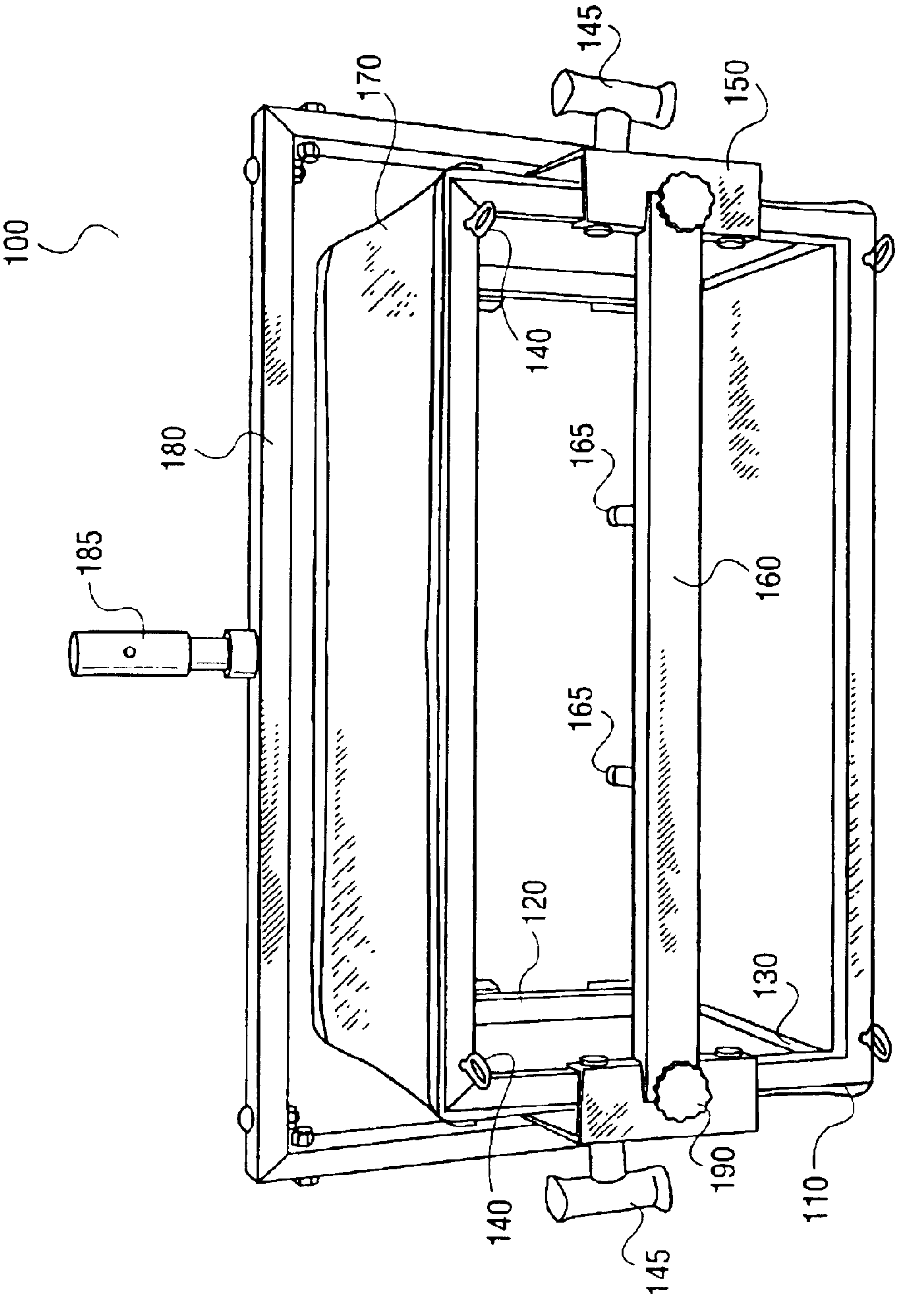
FIG. 1 illustrates a rear view of an embodiment including a fire retardant light box.

FIG. 1 illustrates an embodiment including a fire retardant light box. Light box 100 includes first frame 120 and second frame 110. In this embodiment, first frame 120 is the front frame of light box 100 and second frame 110 is the rear frame of light box 100. First frame 120 and second frame 110 each has a plurality of coupling rods 130. First frame 120, second frame 110 and coupling rods 130 are made of a metal or metal alloy, such as aluminum, or aluminum alloy. One should note, however, that other non-flammable metals and metal alloys can also be used for first frame 120, second frame 120 and coupling rods 130. Light box 100 can be formed from cut pieces of metal or metal alloys, formed from a mold, pressed or bent into shape, etc. In the case where light box 100 is formed from separate pieces, the pieces can be coupled to one another by nuts and bolts, welding, etc.

Light box 100 also includes at least one removable fire retardant cover 170, which is removably coupled to the edges of first frame 120 and second frame 110. Fire retardant cover 170 can be coupled to light box 100 by treated/untreated VELCRO™ (e.g., hook-and-loop fastening means) or attached fastening means (such as snaps, locking pins, nuts and bolts, etc.). In one embodiment, removable fire retardant cover 170 includes a plurality of separate portions that are coupled to the various sides of light box 100. Fire retardant cover 100 can be made of fire retardant material such as fiberglass impregnated with silicon, treated canvas, material coated with fire retardant paint, etc.

Figure 1A:
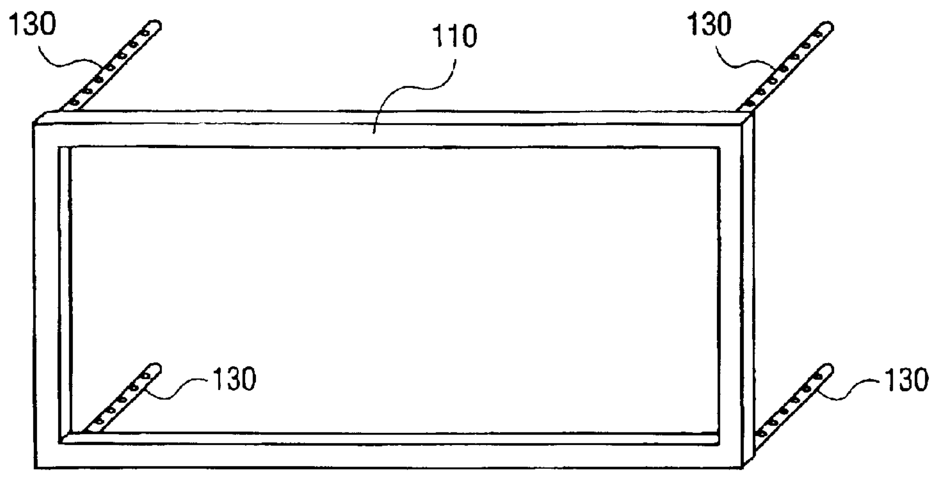
FIG. 1A illustrates a first frame of the embodiment shown in FIG. 1 including a plurality of coupling rods.
Figure 1B:
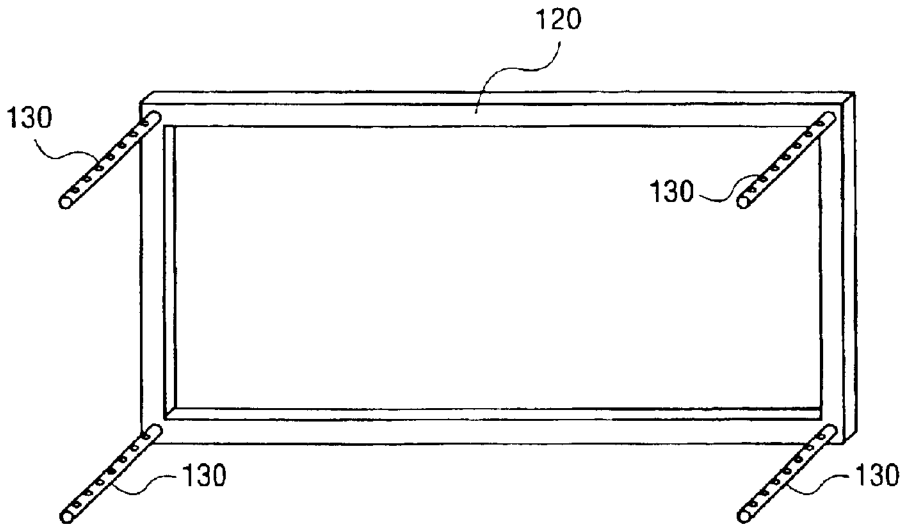
FIG. 1B illustrates a second frame of the embodiment shown in FIG. 1 including a plurality of coupling rods.
Figure 1C:
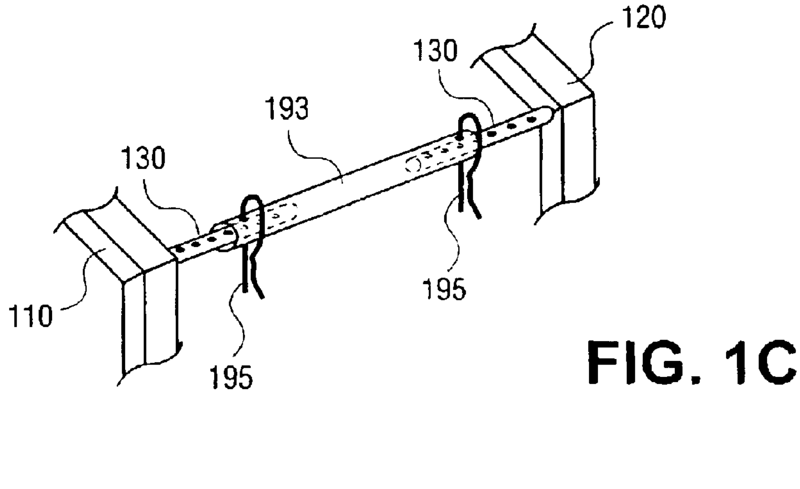
FIG. 1C illustrates a coupling rod of the embodiment shown in FIG. 1.

FIG. 1A illustrates second frame 110 including a plurality of coupling rods 130. FIG. 1B illustrates first frame 120 including a plurality of coupling rods 130. Coupling rods 130 include expansion through holes enabling light box 100 to be expanded in depth. FIG. 1C illustrates coupling rods 130 from first frame 120 and second frame 110. Coupling rods 130 are slidably coupled to expanding rods 193 via a plurality of removable locking pins 195. Expanding rods 193 have a plurality of through holes where locking pins 195 can be entered in order to engage coupling rods 130 via the expansion through holes. First frame 110 and second frame 120 can be variably spaced apart by removing removable locking pins 195, which allows coupling rods 130 to slide/move within expanding rod 193.

Figure 2:
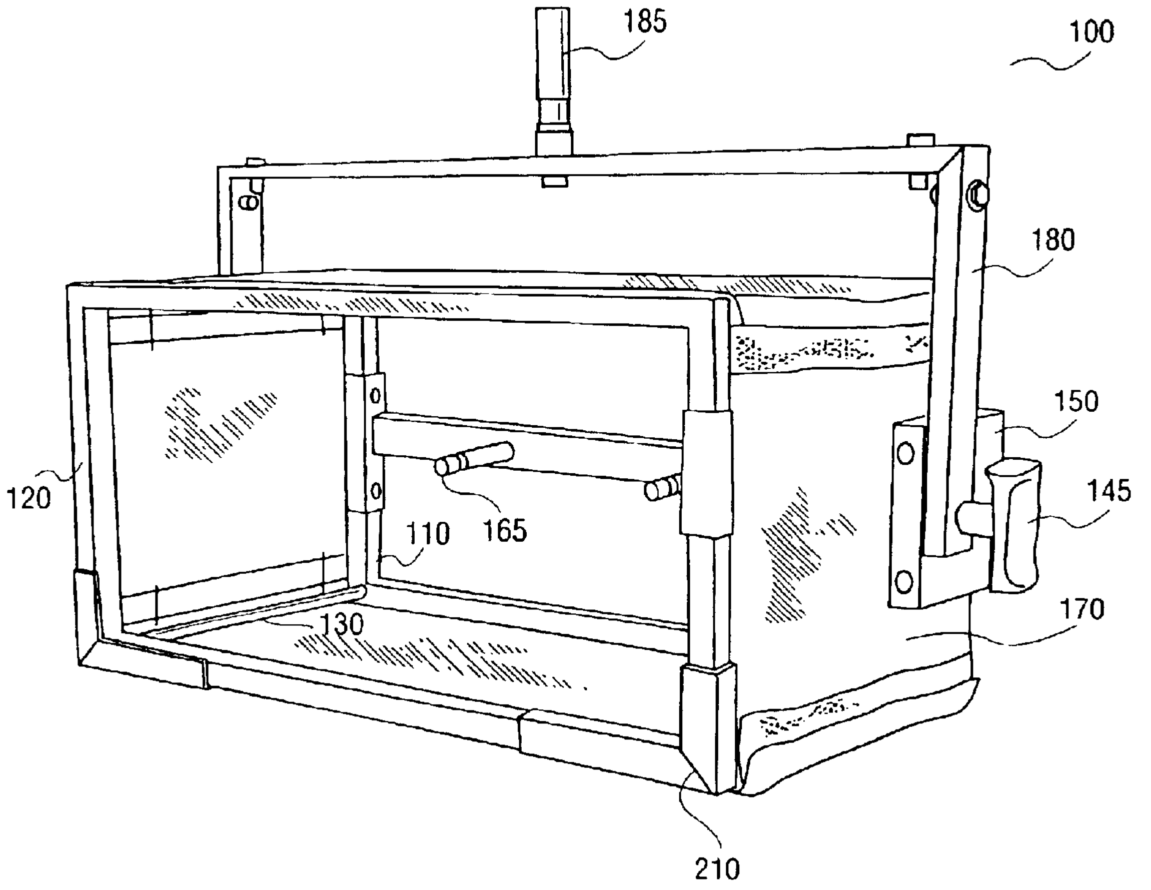
FIG. 2 illustrates a front side view of the embodiment shown in FIG. 1.

FIG. 2 illustrates a front side view of the embodiment shown in FIG. 1. As illustrated in FIG. 2, light box 100 includes a plurality of light fixture coupling brackets 150 that are removably coupled to second frame 110. Light fixture coupling brackets 150 are adaptable to couple to a light bar that includes at least one light disposed within light box 100.

Light fixture coupling brackets 150 can be removably coupled to adjustable gripping device 180. Adjustable gripping device 180 includes gripping pin 185, which is coupled to a rear portion of said gripping device. In one embodiment, first and second tightening handles 145 are used to couple adjustable gripping device 180 to light fixture coupling bracket 150. First and said second tightening handles 145 adjust an angle of adjustable gripping device 180 in relation to light fixture coupling brackets 150. By adjusting adjustable gripping device 180, light box 100 can attach to a device (or be held by a person) for holding light box 100 by gripping pin 185, where light box 100 can face varying angles dependent upon the adjustment of adjustable gripping device 180.

Figure 3:
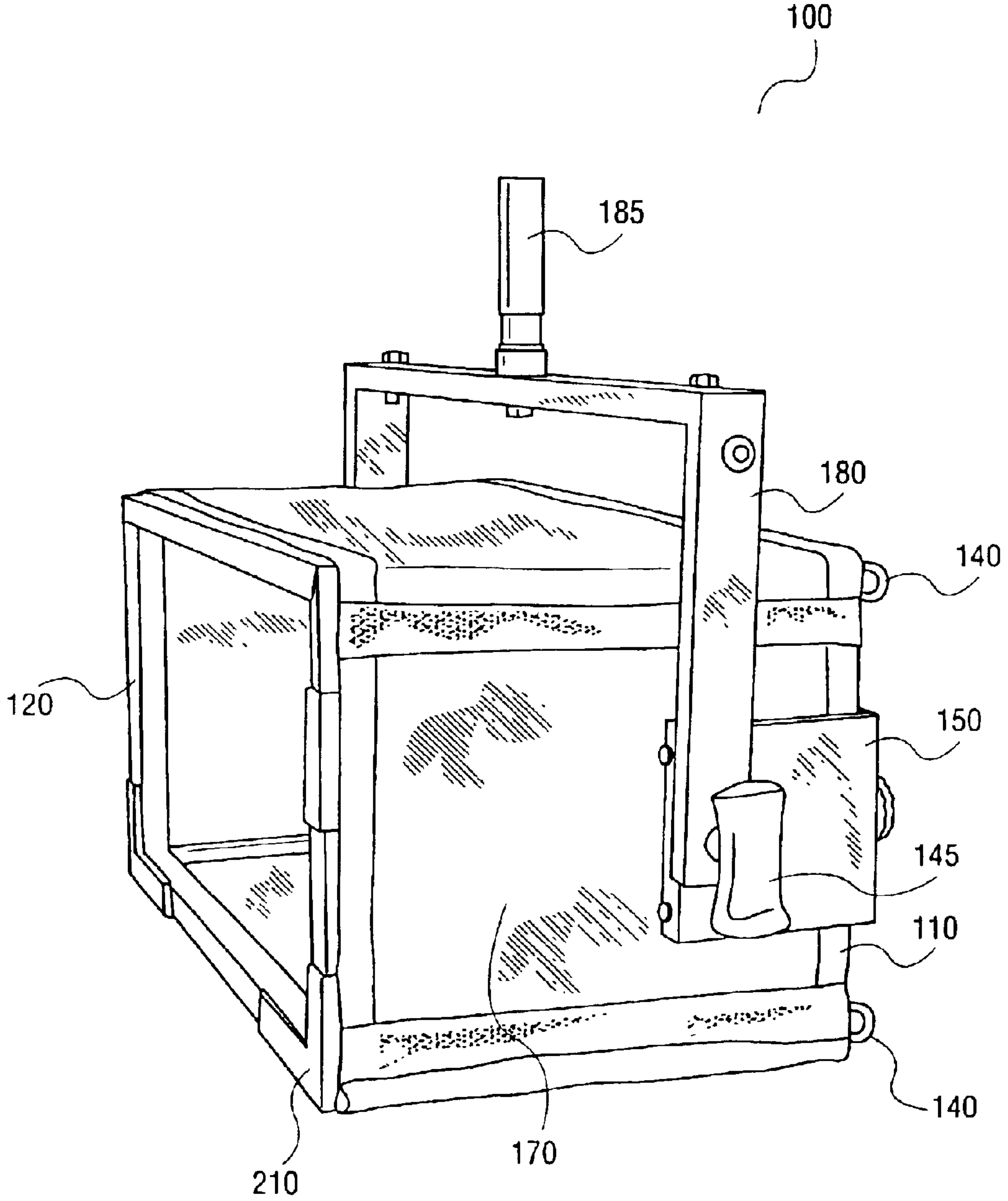
FIG. 3 illustrates a side view of the embodiment shown in FIG. 1.

FIG. 3 illustrates a side view of the embodiment shown in FIG. 1. Coupled to second frame 110 is a plurality of hanging couplers 140. Hanging couplers 140 allow light box 100 to be supported by a plurality of supports, such as independent ropes or wires. In one embodiment, second frame 110 includes four hanging couplers 140 (one at each corner of rear frame 110). It should be noted that other embodiments can include more or less hanging couplers 140.

As illustrated in FIG. 3, first frame 120 is coupled with light filter/diffuser bracket 210. Light filter bracket 210 can hold a plurality of light filter/diffuser frames (referenced as 610 in FIG. 6). By including a plurality of light filter frames 610 held by light filter bracket 210, varying shades or intensities of light can be achieved when light box 100 has a light fixture coupled to second frame 110.

Figure 4:
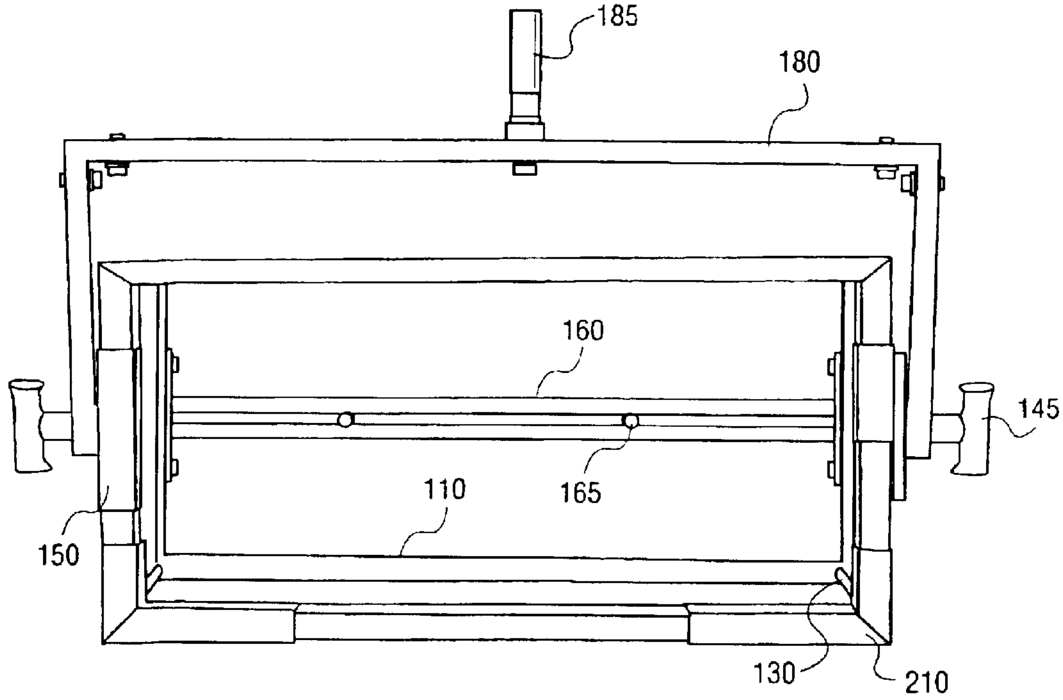
FIG. 4 illustrates a front view of the embodiment illustrated in FIG. 1.

FIG. 4 illustrates a front view of the embodiment illustrated in FIG. 1. Light fixture coupling brackets 150 can be coupled to light bar bracket 160 having at least one light set attaching pin 165. In one embodiment, light attaching pin 165 couples to a removable light set including at least one light bulb. In this embodiment. The removable light set includes sockets where attaching pin 165 is inserted. When attaching pin 165 is inserted to the socket in the removable light set becomes fixed to light bar bracket 160.

Figure 5:
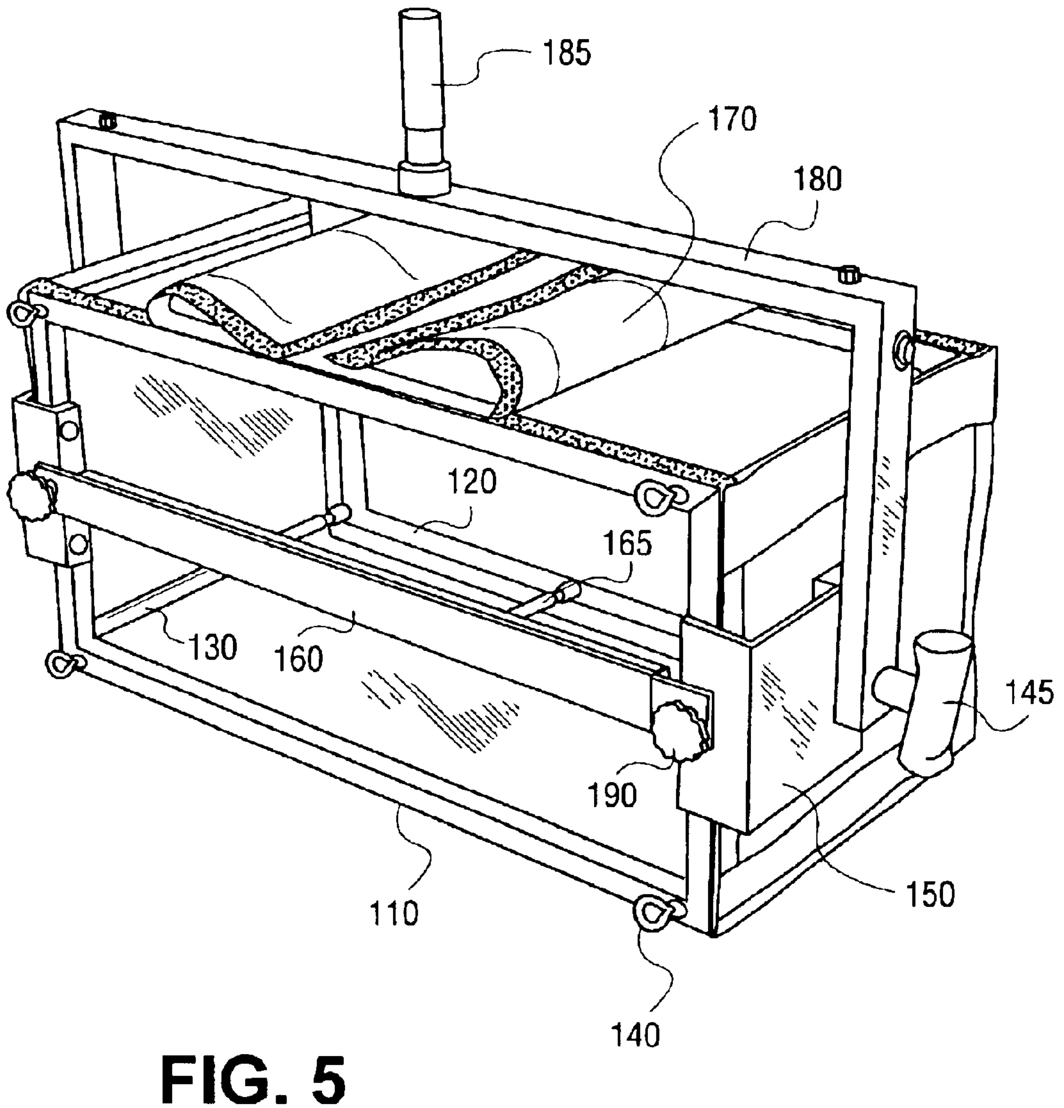
FIG. 5 illustrates a rear side view of the embodiment illustrated in FIG. 1 showing removable fire retardant cover.

FIG. 5 illustrates a rear side view of light box 100 showing removable fire retardant cover 170 partially removed from a plurality of sides of first frame 120 and second frame 110. By partially (or fully) removing fire retardant cover 170 from first frame 120 and second frame 110, different lighting effects can be achieved when a light fixture is disposed within light box 100. Also, different fire retardant covers can easily be replaced with one another. This feature allows for fire retardant covers with different markings to be replaced due to differing user needs. Also, a damaged fire retardant cover can be easily replaced with a non-damaged fire retardant cover.

Figure 5A:
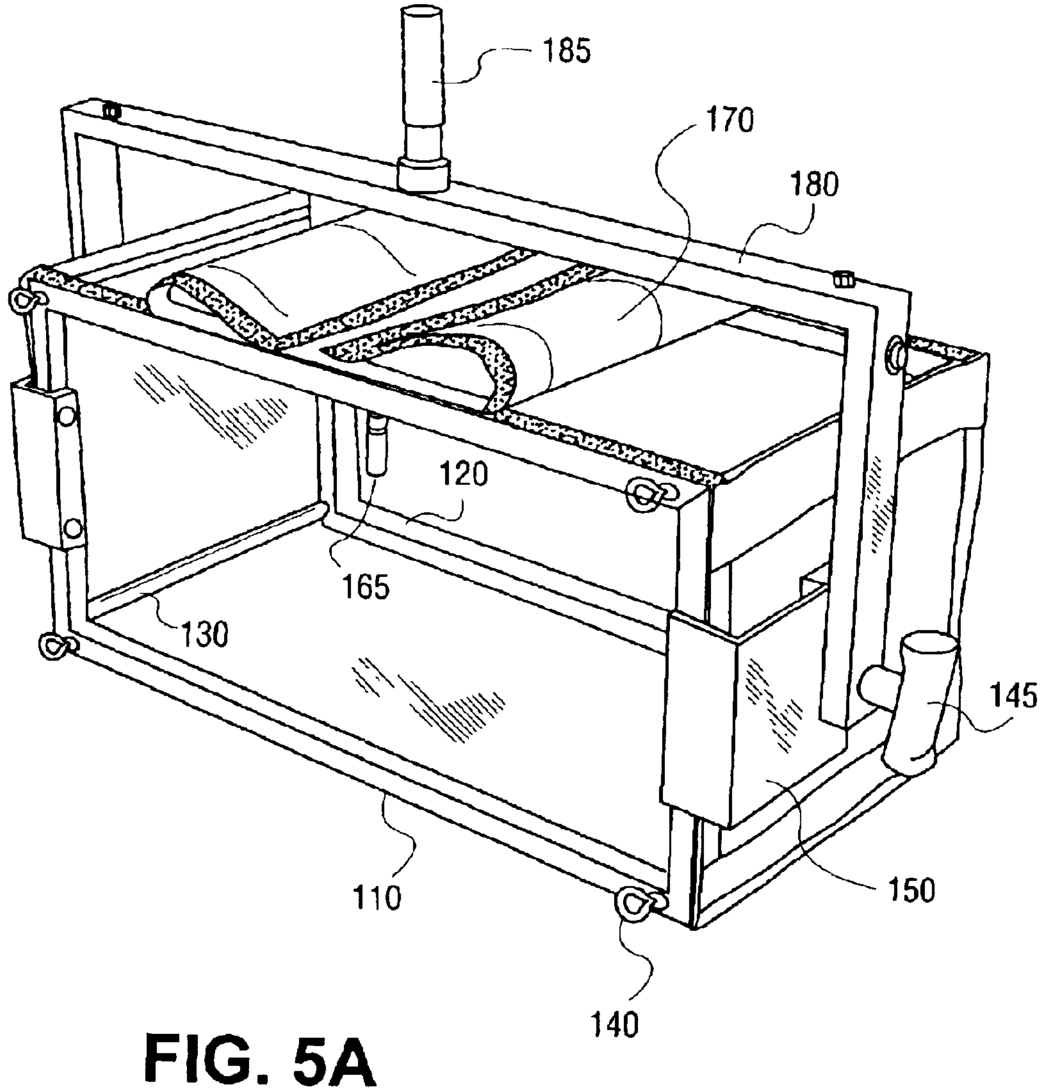
FIG. 5A illustrates a rear side view of the embodiment illustrated in FIG. 1 showing removable fire retardant cover with an attaching pin coupled to the rear frame.

FIG. 5A illustrates a rear side view of light box 100 showing removable fire retardant cover with at least one attaching pin 165 coupled to second frame 110. In this embodiment, attaching pin 165 has a threaded end suitable for threading into second frame 110. It should be noted that other attaching pin 165 can be coupled to second frame 110 by having through-holes in second frame 110 and using a nut, which is coupled by threading on attaching pin 165. Of course, other known attachment means can be used to coupled attaching pin 165 to second frame 110, such as sockets, pins, etc. It should also be noted that more than one attaching pin 165 can be coupled to second frame 110, such as two, three, four, etc. For example, the embodiment illustrated in FIG. 13 can have three attaching pins 165 coupled to second frame 110.

Figure 6:
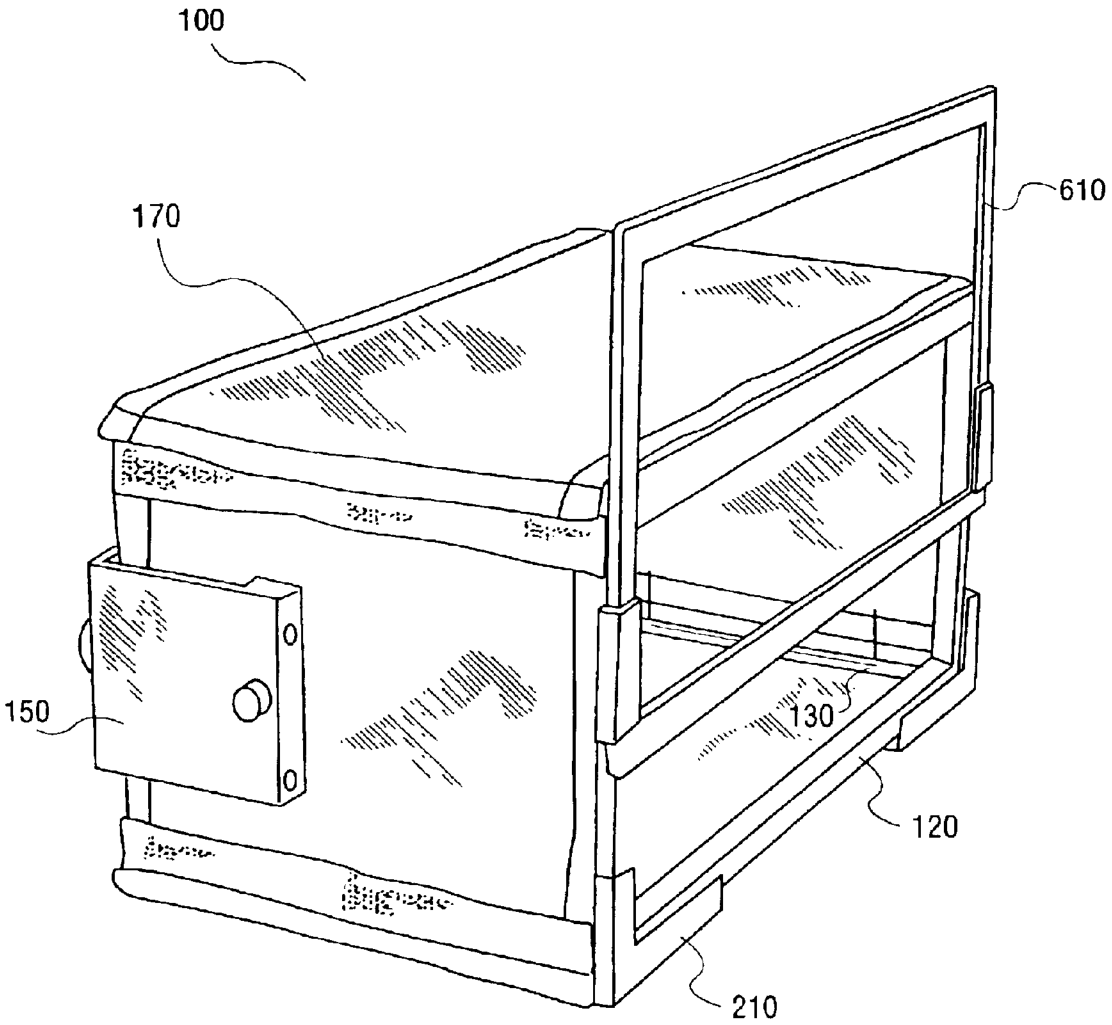
FIG. 6 illustrates a side view of the embodiment illustrated in FIG. 1 including a removable light diffuser.

FIG. 6 illustrates light box 100 including at least one light filter/diffuser frame 610 disposed between light filter/diffuser bracket 210 and first frame 120. Light filter bracket 210 is made of either a metal or metal alloy, such as aluminum or an aluminum alloy. Light filter frame 610 is adapted to hold a light filter (not shown). Light filters are made to adjust light either in shade, color, or contrast.

Figure 7:
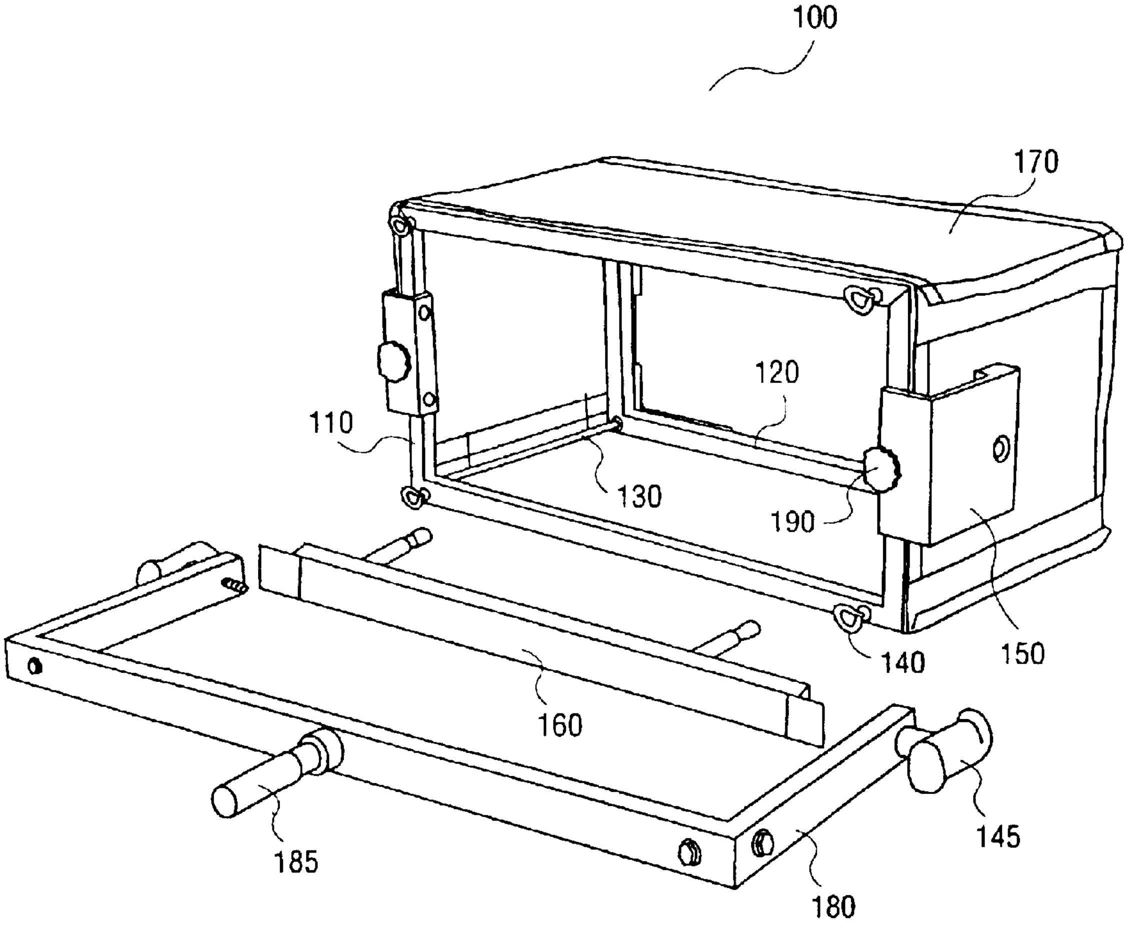
FIG. 7 illustrates a rear view of the embodiment illustrated in FIG. 1 showing a removable adjustable gripping device and removable light bar bracket removed.

FIG. 7 illustrates light box 100 with light bar bracket 160 and adjustable gripping device 180 removed. The varying elements of light box 100 (e.g., light bar bracket 160, adjustable gripping device 180, etc.) are made to be easily removed (and thus replaced/attached) for shipping and maintenance. By having parts that are easily interchanged, maintenance/replacement costs are reduced. Moreover, since light box 100 is made from fire retardant materials and components, light box 100 is safer to use than light boxes made from flammable materials, such as wood.

Figure 8:
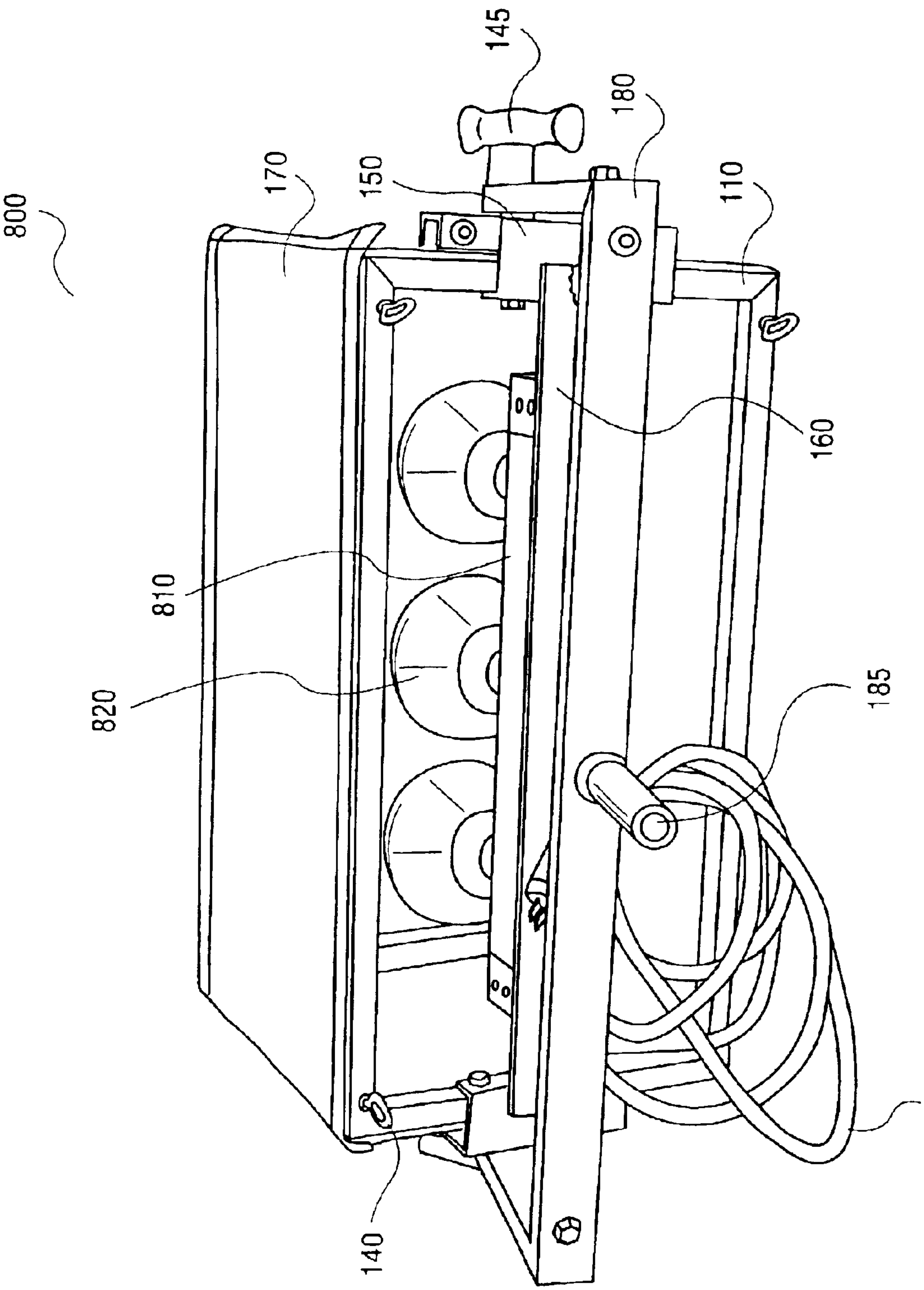
FIG. 8 illustrates a rear view of the embodiment illustrated in FIG. 1 including a light bar fixture coupled to a removable light bar bracket.

FIG. 8 illustrates light box 100 including light fixture (light bar) 810 including a plurality of lights/light bulbs 820. Lights/light bulbs 820 can have power ratings dependent upon the desired need, e.g., 100 Watts (W), 300 W, 500 W, etc.). In this embodiment, three lights 820 are coupled to light bar 810. It should be noted, however, that less than three lights 820 can be coupled to light bar 810. Moreover, other embodiments can be sized to have more than three lights 820 coupled to light bar 810 (e.g., see FIG. 13). Light bar 810 can have different sized light sockets depending upon the size of light(s)/light bulb(s) desired. Light bar 810 is made with lights 820 wired in parallel. Therefore, if one of lights 820 becomes inoperable, the remaining lights 820 will still function. Light bar 810 can be electrically connected via electrical cord 830 to a supply source, such as 110/120 Volts, 210/220 Volts, etc. Also, since light bar 810 is easily replaceable, light bar 810 can be made with non United States electrical plugs, depending upon the available electrical connectors available in the geographic location (e.g., European round electrical plug connectors).

Figure 9:
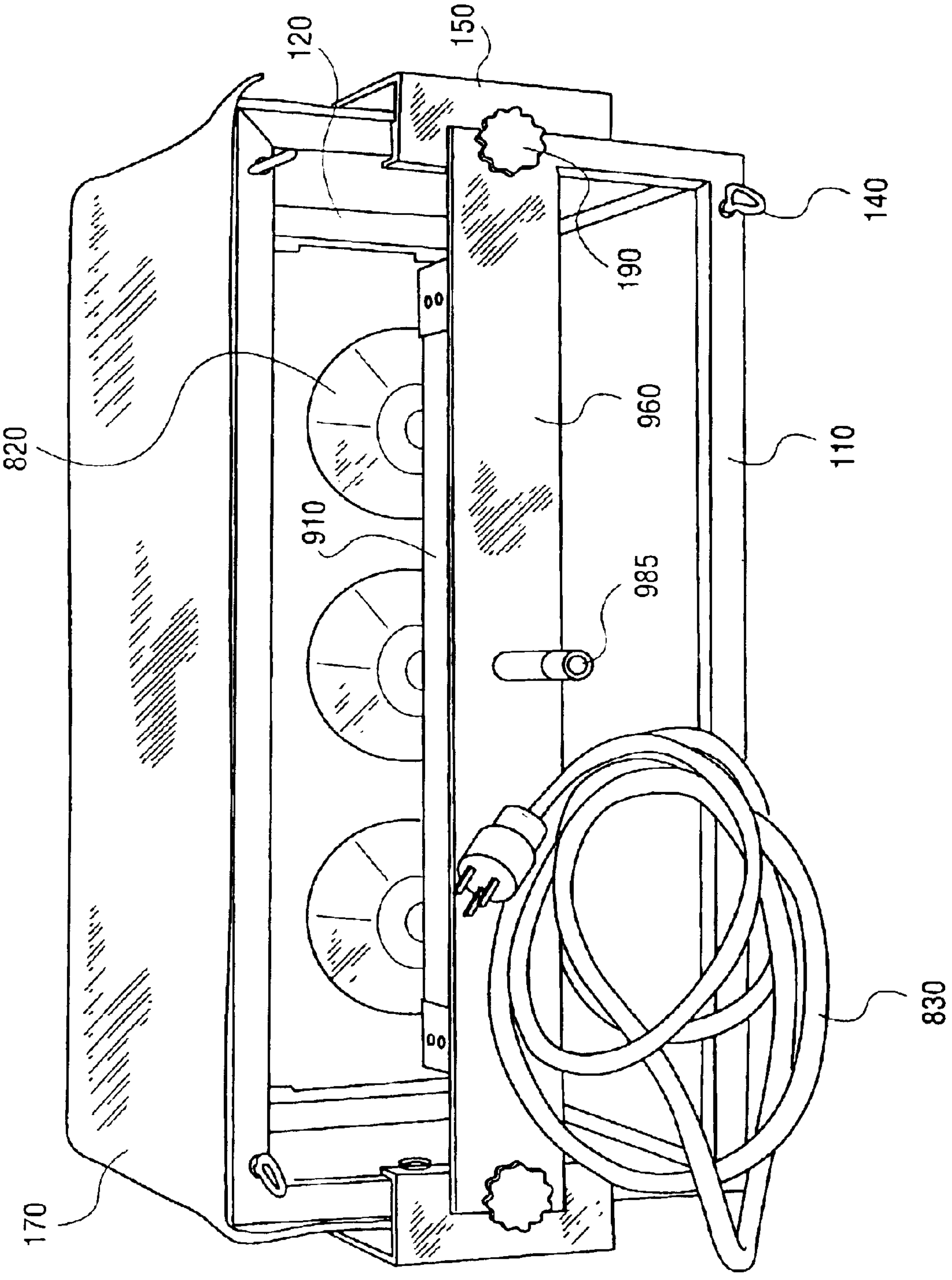
FIG. 9 illustrates another rear view of the embodiment illustrated in FIG. 8.

FIG. 9 illustrates the embodiment shown in FIG. 8 with adjustable gripping device 180 removed and alternate light bar bracket 960 coupled to second frame 110. In this embodiment, light bar bracket 960 includes at least one gripping pin 985. Light bar bracket 960 is directly coupled to light bar 910. In this embodiment, light bar bracket 960 does not include attaching pins 165. Light bar 910 can be coupled to light bar bracket 960 by connecting means, such as fasteners (e.g., nuts and bolts, screws, etc.), welding, or by gripping pin 985. Gripping pin 985 can be gripped (i.e., held or attached to a gripping device) by a device suitable for attachment to pin 985 (such as ???), or held by an individuals hand.

Figure 10:
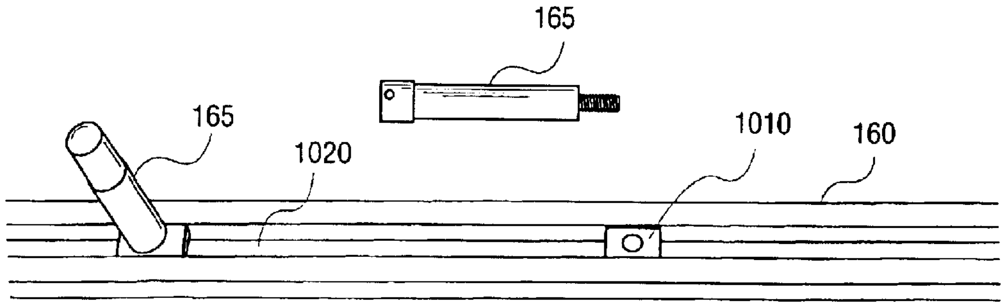
FIG. 10 illustrates a light bar bracket including a removable light set attaching pin and also showing a removable light set attaching pin removed.

FIG. 10 illustrates light bar bracket 160. Light bar bracket 160 (as mentioned above) can be coupled with at least one attaching pin 165. In this embodiment, attaching pin 165 has a threaded end suitable for threading into bracket coupler 1010. In other embodiments, attaching pin 165, instead of directly threading into bracket coupler 1010, can be coupled to bracket coupler 1010 by using a nut. In one embodiment, bracket coupler 1010 is placed in groove 1020 at a desired location in order to couple with a light bar, such as light bar 810. That is, bracket coupler(s) 1010 is moved to a spacing allowing for coupling to a socket(s) in the light bar. In another embodiment, bracket coupler(s) 1010 are fixed or made part of light bar bracket 160 (i.e., for a specific light bar having a set spacing of a socket(s) for coupling to attaching pin 165(*s*).

Figure 11:
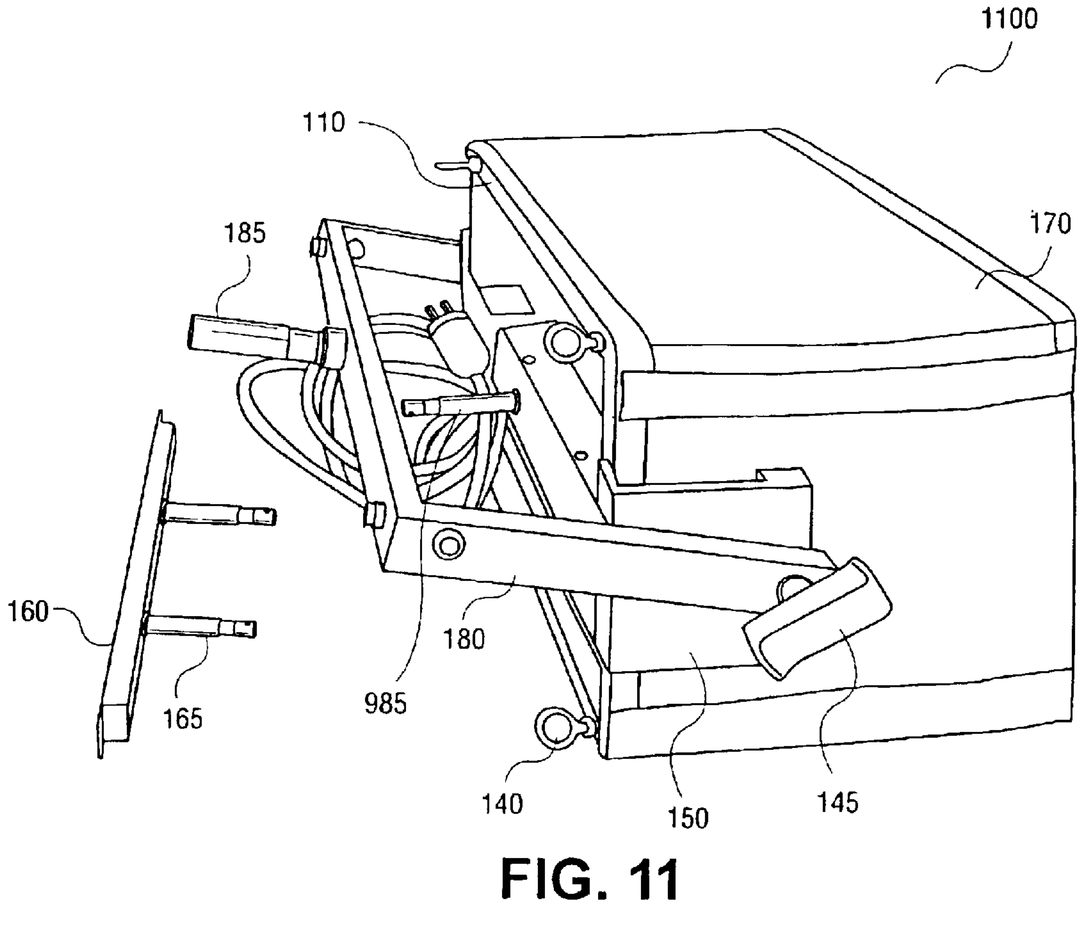
FIG. 11 illustrates the embodiment shown in FIG. 1 including a light bar fixture having a gripping pin and also showing a removable light bar bracket removed.

FIG. 11 illustrates a light box system. Light box system 1100 includes (as options or altogether as a kit) light box 100 including a light bar coupled to light bar coupling brackets 150. It should be noted that while light box system 1100 is illustrated with light bar bracket 960 coupled to light bar coupling brackets 150, light bar bracket 160 (part of light box system 1100 illustrated in FIG. 11) is interchangeable, depending upon the light bar desired (it should be noted that light bars 810 and 910 are part of light box system 1100). By including light bar bracket 160, light bar bracket 960, light filter bracket 210, light filter frame(s) 610, and adjustable gripping device 180, many different configurations of light system 1100 are possible, depending upon the desired lighting effect. Also, other mentioned embodiments and elements can be included in light box system 1100 as well, depending upon the customer's needs.

Figure 12:
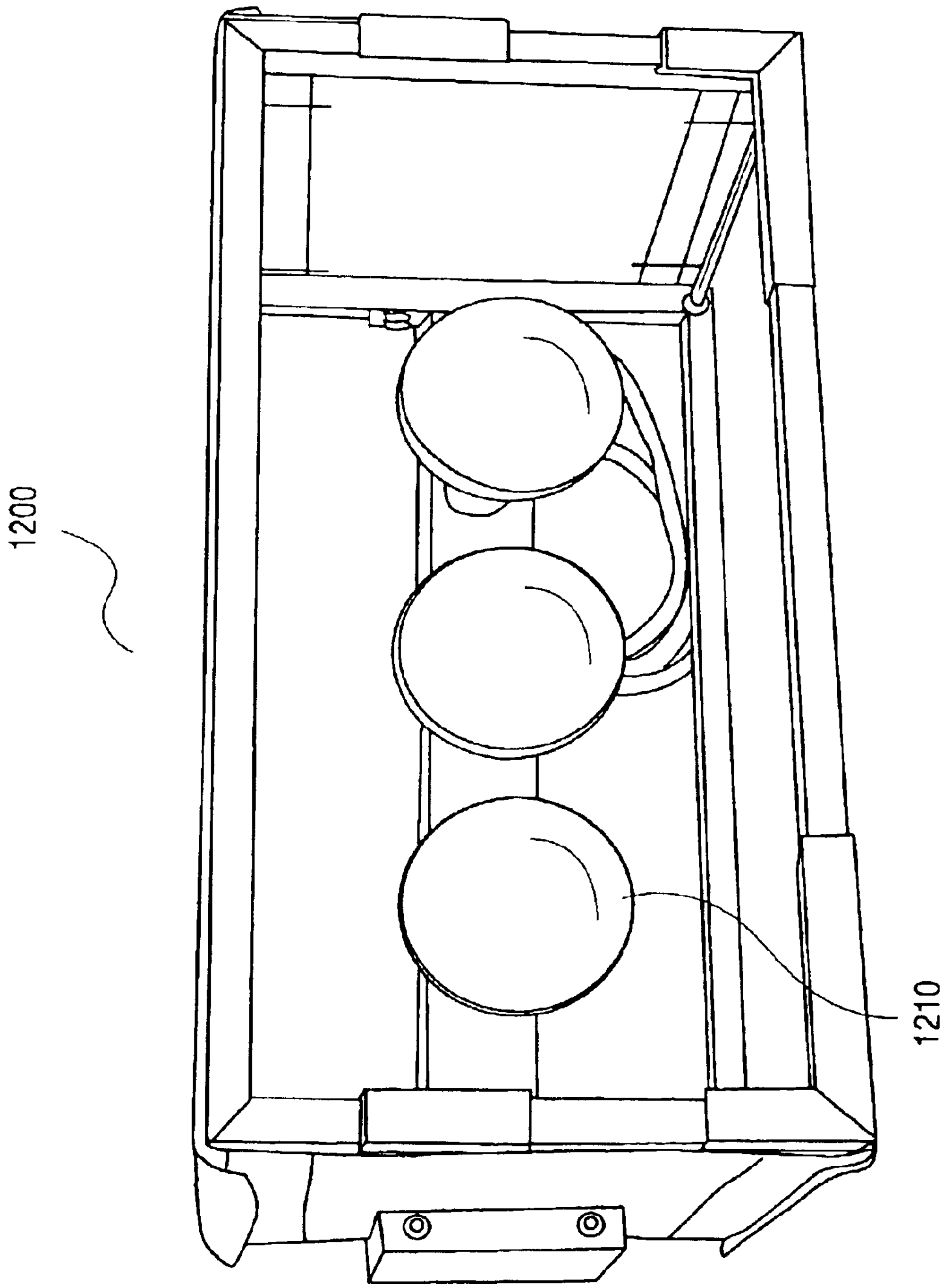
FIG. 12 illustrates an embodiment including a light set with three lights.
Figure 13:
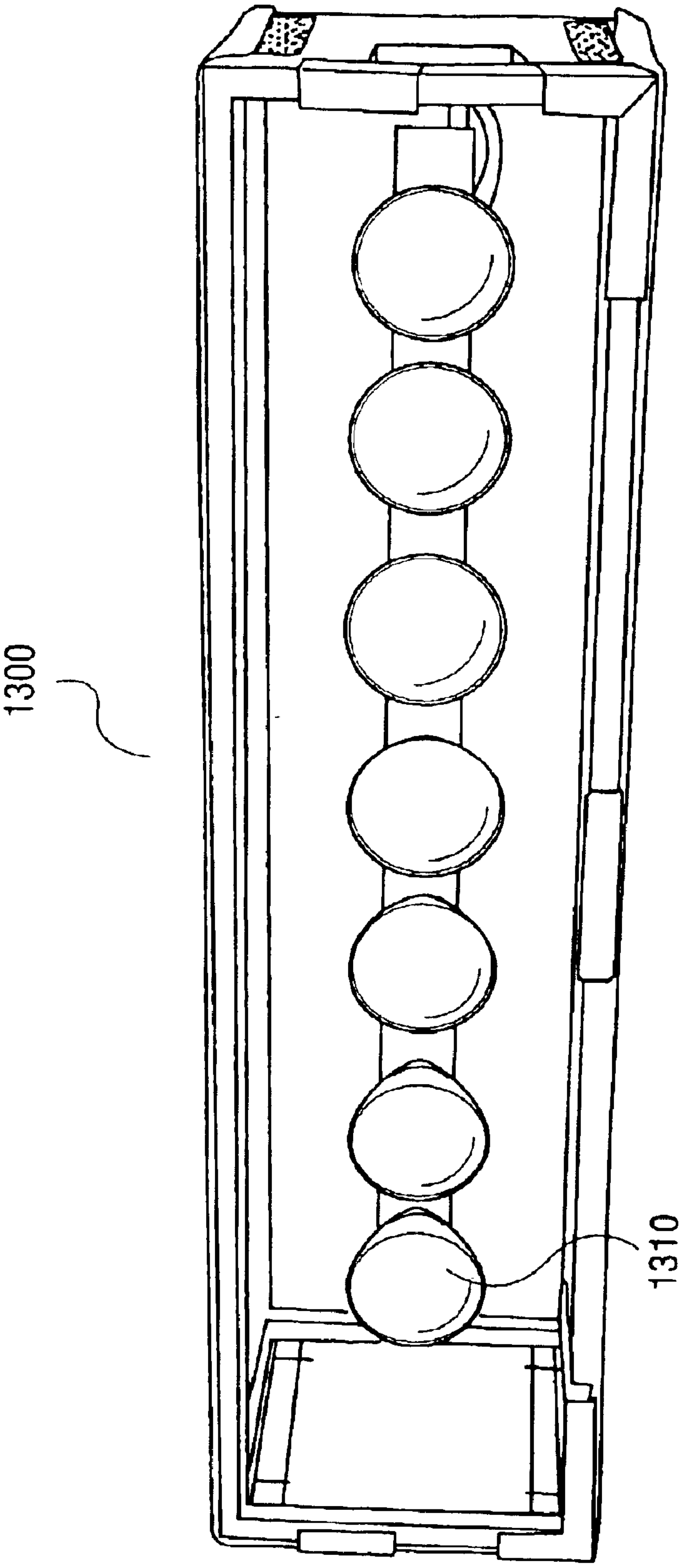
FIG. 13 illustrates an embodiment including a light set with seven lights.

In order to illustrate examples of light bar configurations for different embodiments, FIGS. 12 and 13 are included. FIG. 12 illustrates a light box embodiment (e.g., light box 100, light box system 1100) including three-bulb light bar 1210. FIG. 13 illustrates a light box embodiment (e.g., light box 100, light box system 1100) including seven-bulb light bar 1310. Other light/light bulb arrangements can be made similar to the above-mentioned embodiments depending upon the desired lighting effect. Thus, the above embodiments can vary in size to accommodate various sized light bars. The thickness of component material can also vary according to the size of light bar (i.e., size of light set). Thus, frames, couplers, gripping pins, gripping devices, etc. can vary in size and thickness to allow for more load support.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A light box comprising:

a first frame and a second frame, said first and second frames each having a plurality of coupling rods;

at least one removable fire retardant cover coupled to a plurality of edges of said first and second frames;

a plurality of expanding rods, said plurality of coupling rods slidably coupled to said plurality of expanding rods; and a plurality of light fixture coupling brackets suitable for attaching to said second frame, wherein said plurality of light fixture coupling brackets adaptable to couple to a light bar having at least one light, said light bar is supported within the second frames.

2. The light box of claim 1, said second frame further including a plurality of hanging couplers.

3. The light box of claim 1, said plurality of light fixture coupling brackets adaptable to couple to an adjustable gripping device.

4. The light box of claim 1, said adjustable gripping device further including:

a gripping pin coupled to a rear portion of said gripping device; and a first and a second tightening handle, wherein said first and said second tightening handle adjusts an angle of said adjustable gripping device in relation to said plurality of light fixture coupling brackets.

5. The light box of claim 1, wherein said light bar includes at least one gripping pin.

6. The light box of claim 1, said plurality of light fixture coupling brackets adaptable to couple to a light bar bracket having at least one light set attaching pin, wherein said at least one light attaching pin couples to a removable light set.

7. The light box of claim 1, wherein said plurality of coupling rods and said plurality of expanding rods each have a plurality of expanding holes, wherein said plurality of expanding rods and said plurality of coupling rods can be adjustably coupled by a plurality of set pins to adjust a distance between said first frame and said second frame.

8. The light box of claim 1, wherein said first frame, said second frame, and said plurality of light fixture coupling brackets are made from one of a metal and a metal alloy.

9. The light box of claim 1, further comprising at least one attaching pin coupled to said second frame.

10. The light box of claim 1, said first frame further including a plurality of light filter brackets.

11. The light box of claim 10, said plurality of light filter brackets hold at least one light filter frame.

12. A light box system comprising:

a front frame and a rear frame, said front and rear frames each having a plurality of coupling rods;

at least one removable fire retardant cover coupled to a plurality of edges of said front and rear frames;

a plurality of expanding rods, said plurality of coupling rods slidably coupled to said plurality of expanding rods;

a plurality of light bar coupling brackets removably coupled to said rear frame; and a light bar coupled to said light bar coupling brackets, said light bar having at least one light.

13. The light box system of claim 12, said rear frame further including a plurality of hanging couplers.

14. The light box system of claim 12, said plurality of light bar coupling brackets removably coupled to an adjustable gripping device.

15. The light box system of claim 12, said adjustable gripping device further including:

a gripping pin coupled to a rear portion of said gripping device; and a first and a second tightening handle, wherein said first and said second tightening handle adjusts an angle of said adjustable gripping device in relation to said plurality of light bar coupling brackets.

16. The light box system of claim 12, wherein said light bar includes at least one gripping pin.

17. The light box system of claim 12, said plurality of light bar coupling brackets adaptable to couple to a light bar bracket having at least one light set attaching pin, wherein said at least one light attaching pin couples to a removable light set.

18. The light box system of claim 12, said front frame further including a plurality of light filter brackets.

19. The light box system of claim 12, wherein said plurality of coupling rods and said plurality of expanding rods each have a plurality of expanding holes, wherein said plurality of expanding rods and said plurality of coupling rods can be adjustably coupled by a plurality of set pins to adjust a distance between said front frame and said rear frame.

20. The light box system of claim 12, further including at least one attaching pin coupled to said rear frame.

* * * * *

UNITED STATES PATENT AND TRADEMARK OFFICE

CERTIFICATE OF CORRECTION

PATENT NO. : 6,814,467 B2
APPLICATION NO. : 10/261723
DATED : November 9, 2004
INVENTOR(S) : Jenkins It is certified that error appears in the above-identified patent and that said Letters Patent is hereby corrected as shown below:

Col. 6 line 33 please delete “frames” and insert -- frame --.

Signed and Sealed this

Twentieth Day of May, 2008

JON W. DUDAS
*Director of the United States Patent and Trademark Office*